United States Patent
Kulkarni et al.

(10) Patent No.: US 10,068,202 B2
(45) Date of Patent: Sep. 4, 2018

(54) INSTANTIATING COMPLEX EVENT SCENARIOS USING DYNAMIC RULE CREATION

(75) Inventors: Ashish A. Kulkarni, Bangalore (IN); Venkatesh Patil, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1893 days.

(21) Appl. No.: 12/761,998

(22) Filed: Apr. 16, 2010

(65) Prior Publication Data
US 2011/0258138 A1    Oct. 20, 2011

(51) Int. Cl.
G06Q 10/00 (2012.01)
G06Q 10/10 (2012.01)
G06Q 10/06 (2012.01)

(52) U.S. Cl.
CPC ........... G06Q 10/10 (2013.01); G06Q 10/067 (2013.01)

(58) Field of Classification Search
None
See application file for complete search history.

(56) References Cited

U.S. PATENT DOCUMENTS

| | | | |
|---|---|---|---|
| 6,604,093 B1* | 8/2003 | Etzion et al. | 706/47 |
| 7,457,728 B2* | 11/2008 | Chen et al. | 702/189 |
| 2003/0163783 A1 | 8/2003 | Chikirivao et al. | |
| 2007/0135936 A1* | 6/2007 | Dumas et al. | 700/29 |
| 2007/0168990 A1* | 7/2007 | Alshab et al. | 717/127 |
| 2007/0255529 A1 | 11/2007 | Biazetti et al. | |
| 2007/0276715 A1* | 11/2007 | Beringer | G06Q 10/0633 705/7.27 |
| 2007/0288258 A1* | 12/2007 | Beringer | G06Q 10/06 705/7.27 |
| 2008/0184206 A1* | 7/2008 | Vikutan | G06F 11/3688 717/127 |
| 2008/0209078 A1* | 8/2008 | Bates et al. | 710/10 |
| 2009/0150319 A1* | 6/2009 | Matson et al. | 706/47 |
| 2009/0192867 A1* | 7/2009 | Farooq et al. | 705/10 |
| 2009/0210364 A1 | 8/2009 | Adi et al. | |

OTHER PUBLICATIONS

"Configuring the Complex Event Processor", Oracle Complex Event Processing Application Development Guide, Release 10 R.3. (10.3), Sep. 2008, Chapter 7, pp. 7-1 thru 7-6. Retrieved from http://download.oracle.com/docs/cd/E13157_01/wlevs/docs30/create_apps/processor.html.

Mark Proctor, "Complex Event Processing (CEP)—Thoughts: Tooling, Rules Authoring, Testing, Etc.," pp. 1-4, Dec. 18, 2007. Retrieved from http://www.jboss.org/community/wiki/ComplexEventProcessingCEP-Thoughts.

* cited by examiner

*Primary Examiner* — Stephanie Z Delich
(74) *Attorney, Agent, or Firm* — Patterson + Sheridan, LLP

(57) ABSTRACT

Systems, methods and articles of manufacture are disclosed for creating, reconfiguring, and reusing business scenarios. In one embodiment, a complex event processing (CEP) tool expert generates a business scenario template using a CEP tool. Once the business scenario template is generated, a business user may generate multiple business scenario instances from the business scenario templates, without using the CEP tool and without involvement from the CEP tool expert.

24 Claims, 7 Drawing Sheets

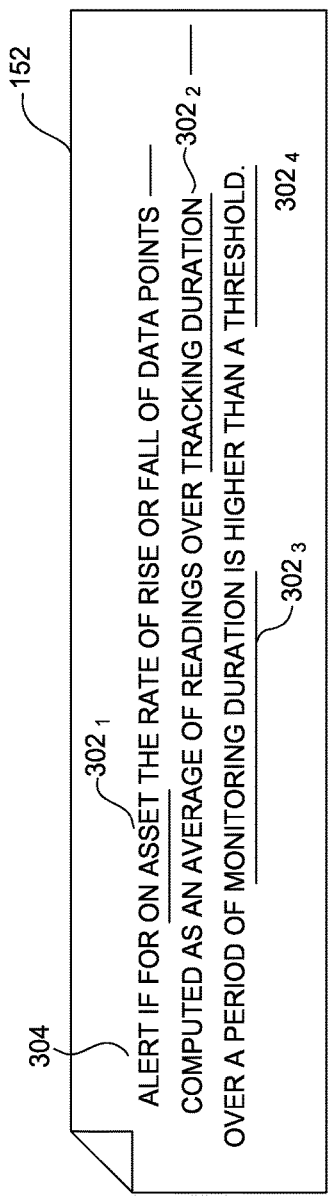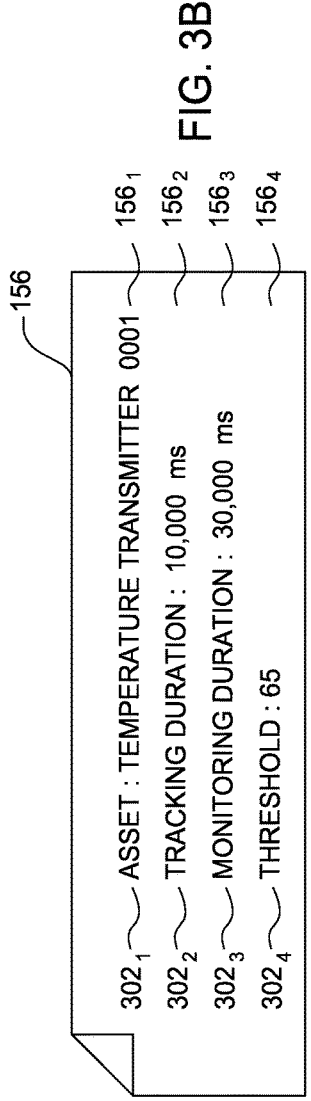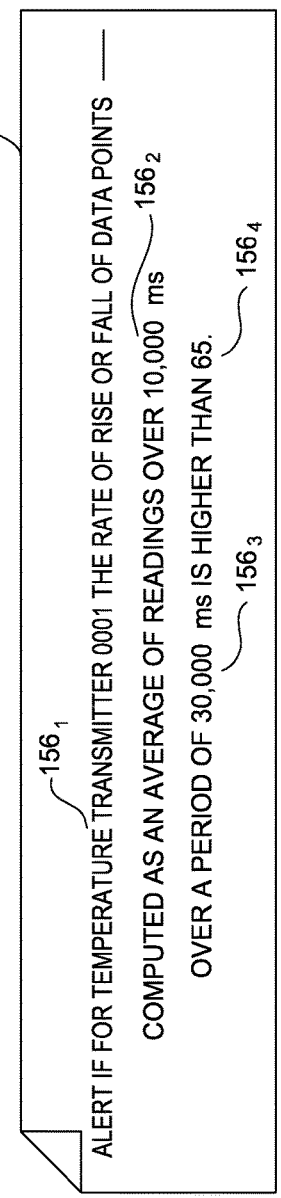
FIG. 3A
FIG. 3B
FIG. 3C

INSTANTIATING COMPLEX EVENT SCENARIOS USING DYNAMIC RULE CREATION

BACKGROUND

Field

Embodiments of the invention relate generally to complex event processing and more particularly to abstracting and realizing complex event scenarios using dynamic rule creation.

Description of the Related Art

Today, many data processing systems employ correlation and automation solutions within complex environments. These solutions are used to consolidate, correlate and analyze information arising from computer-monitored user or system activities (simple events) occurring within or across network systems to quickly and accurately identify—and take action in response to—a condition or problem. Processes or actions may be taken to adjust, fix, reconfigure or provision resources to solve the problem when the cause is determined. These correlation and automation solutions are also referred to as complex event processing (CEP) solutions.

SUMMARY

One embodiment of the invention includes a method that includes receiving a selection of a business scenario template that defines an occurrence of a complex event and that specifies at least one parameter for customizing the complex event. The method may also generally include receiving at least one value for the at least one parameter specified by the selected business scenario template; generating a business scenario instance from the at least one value and the selected business scenario template; and upon detecting the occurrence of the complex event based on the business scenario instance, executing an action responsive to the occurrence of the complex event.

Another embodiment of the invention includes a computer-readable storage medium containing a program which, when executed, performs an operation that includes receiving a selection of a business scenario template that defines an occurrence of a complex event and that specifies at least one parameter for customizing the complex event. The operation may also generally include receiving at least one value for the at least one parameter specified by the selected business scenario template; generating a business scenario instance from the at least one value and the selected business scenario template; and upon detecting the occurrence of the complex event based on the business scenario instance, executing an action responsive to the occurrence of the complex event.

Another embodiment of the invention includes a system having one or more computer processors and a memory containing a program which, when executed by the one or more computer processors, is configured to perform an operation that includes receiving a selection of a business scenario template that defines an occurrence of a complex event and that specifies at least one parameter for customizing the complex event. The operation may also generally include receiving at least one value for the at least one parameter specified by the selected business scenario template; generating a business scenario instance from the at least one value and the selected business scenario template; and upon detecting the occurrence of the complex event based on the business scenario instance, executing an action responsive to the occurrence of the complex event.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3A illustrates a business scenario template, according to one embodiment of the invention.

FIG. 3B illustrates parameter values for the business scenario template, according to one embodiment of the invention.

FIG. 3C illustrates a business scenario instance of the business scenario template, according to one embodiment of the invention.

DETAILED DESCRIPTION OF THE PREFERRED EMBODIMENTS

Figure 1:
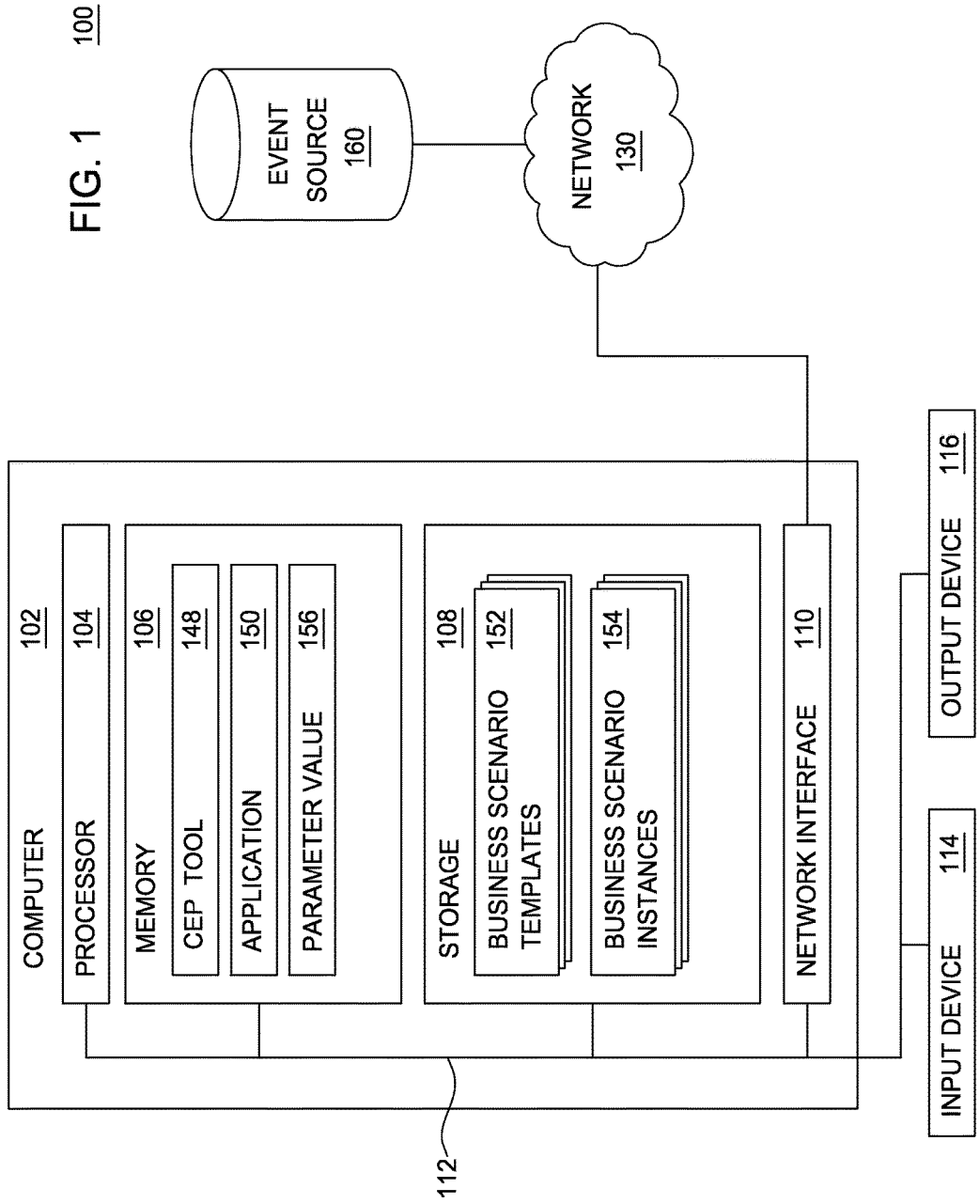
FIG. 1 is a block diagram illustrating a system for monitoring business scenarios, according to one embodiment of the invention.

Embodiments of the invention provide techniques for creating, reconfiguring, and reusing business scenarios. Each business scenario may be defined in terms of higher-level events, also referred to as complex events. Complex event processing (CEP) involves deriving the higher-level events from analyzing, correlating, and summarizing lower-level events (e.g., simple events or other complex events) in event-driven systems. These higher-level events are suited to notifying people of conditions, opportunities or problems in simple-to-understand terms (or for triggering automated processes) so that action can be taken to produce a desired result. The term "event-driven" refers to an ability of an application to react intelligently to changes in conditions, such as an impending failure of a hard disk or a sudden change in stock price.

One embodiment of the invention abstracts business scenarios from a specific domain into reusable business scenario templates with configurable parameters. The parameters may be specific to the scenario in the domain. Further, the parameters do not require knowledge of any CEP tool. That is, a business user may readily configure the parameters—even if the business user has little or no familiarity with how to use the CEP tool. Aside from configurable parameters, the business scenario template may also include derived parameters, each of which is derived from a definition of the business scenario template. Each derived parameter may be a pointer to another business scenario template—to define a higher-level business scenario (that itself includes other business scenarios).

In one embodiment, a CEP tool expert—i.e., a technical user who is well versed in using the CEP tool—may define each business scenario template using a CEP tool. Once defined, however, the CEP tool (and knowledge thereof) is no longer required for creating business scenario instances from the business scenario templates. Further, involvement of the CEP tool expert is no longer required for creating business scenario instances from the business scenario templates (or for modifying business scenario instances). Advantageously, a business user who is not familiar with the CEP tool may create business scenario instances by selecting a business scenario template and supplying values for each parameter included in the business scenario template. The business user may also activate a business scenario instance to begin monitoring occurrence of the complex event(s) specified by the business scenario instance. Further, the business user may update a business scenario instance by selecting a business scenario instance and providing new parameter value(s). Consequently, business scenarios may be created and updated more efficiently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for monitoring business scenarios, according to one embodiment of the invention. The networked system 100 includes a computer 102. The computer 102 is connected to an event source 160 via a network 130. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers and the event source 160 via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a CEP tool 148, an application 150, and one or more parameter values 156. The memory 106 may also include a CEP runtime engine, which monitors the occurrence of business scenarios that are activated (e.g., by a user). In an alternative embodiment, the CEP runtime engine executes on another computer connected to the computer 102 via the network 130. The storage 108 of the computer 102 includes business scenario templates 152 and business scenario instances 154. In one embodiment, a CEP tool expert may generate the business scenario templates 152 using the CEP tool 148.

In one embodiment, the CEP tool 148 allows the CEP tool expert to generate business scenarios and/or business scenario templates 152. The business scenario template 152 is an abstract, parameterized business scenario. The CEP tool expert may be knowledgeable about interdependencies between simple events and/or complex events. The CEP tool expert may also be knowledgeable about a lifespan for a business scenario—i.e., times during which the business scenario may actually occur. Advantageously, the CEP tool expert may specify the interdependencies and lifespan of a business scenario in the business scenario template 152, without having to manually and separately create and/or instantiate, in a proper order (to satisfy the interdependencies), templates for the simple events, complex events, and the lifespan, respectively.

In one embodiment, the parameters of the business scenario template 152 act as placeholders for both user-configurable parameter values and system-derived interdependencies (e.g., by the application 150) between events. The business scenario template 152 may also include a description attribute that conveys the meaning (i.e., the semantics) of the parameter. The description attribute may contain a predefined value representing a user-configurable parameter (e.g., "SParam"). Alternatively, the description attribute may contain a name of another business scenario template that is being referenced by the business scenario template 152.

In one embodiment, after the business scenario templates 152 are generated, a business user—who may not necessarily be well versed in using the CEP tool—may provide the application 150 with a parameter value 156 to generate a business scenario instance 154 from the business scenario templates 152. That is, the application 150 receives user-supplied values for the configurable parameters. In one embodiment, the application 150 may generate the business scenario instance 154 according to the following pseudocode:

TABLE I

Pseudocode for generating a business scenario instance 154

```
for all templates in the business scenario template
    instance = new <template instance>
    instance.setInstanceName(<unique name>)
    instance.setTemplateName(<template name>)
```

TABLE I-continued

Pseudocode for generating a business scenario instance 154

```
end for
for all templates in the business scenario template
    for all parameters in the template:
        if parameter.description ="SParam" then
            parameter.value = <user defined value>
        end if
        else
            <search parameter name in template instances>
            parameter.value = instance.getInstanceName( )
        end else
    end for
    // set the parameters in the template instance
    corresponding to this template
        instance.setParameters(parameters[ ])
end for
```

That is, in generating a business scenario instance 154, the application 150 may process all the parameters of the business scenario template 152. Processing the parameters of the business scenario template 152 may include setting configurable parameters to user-supplied parameter values. Processing the parameters of the business scenario template 152 may also include setting derived parameters to names of other business scenario templates. Thus, the business scenario instance 154 may be generated without requiring knowledge of the CEP tool 148 on the part of the business user and without requiring involvement of the CEP tool expert. Advantageously, the business user may more efficiently and conveniently create and/or deploy business scenario instances, without involvement of the technical user (i.e., the CEP tool expert).

Figure 2:
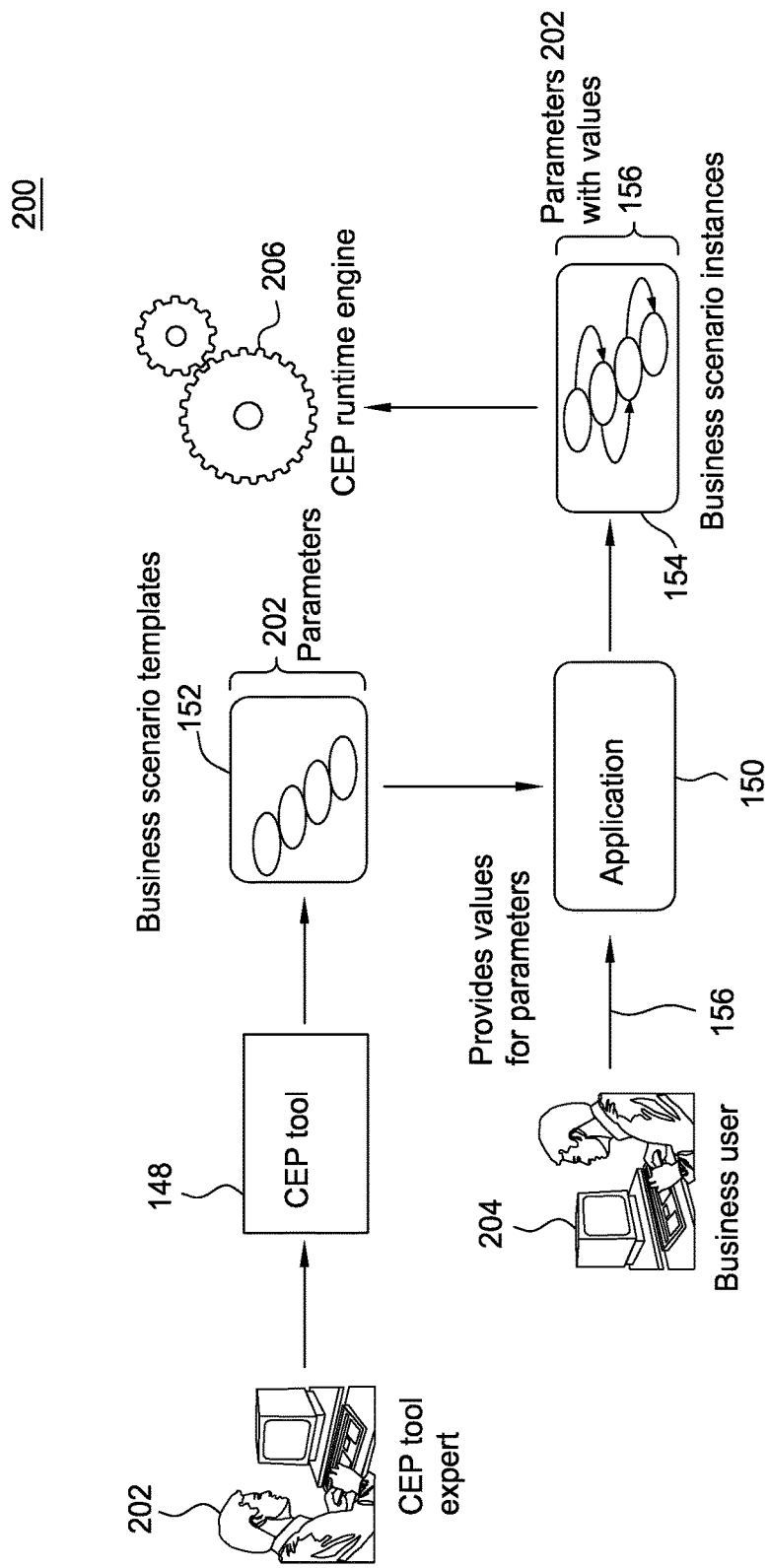
FIG. 2 is a data flow diagram illustrating how a business scenario instance is generated from a business scenario template, according to one embodiment of the invention.

FIG. 2 is a data flow diagram 200 illustrating how a business scenario instance 154 is generated from a business scenario template 152, according to one embodiment of the invention. As shown, a CEP tool expert 202 may generate the business scenario template 152 using the CEP tool 148. The business scenario template 152 may include parameters 202. After the business scenario template 152 is generated, a business user 204 may provide values 156 for the parameters 202 via the application 150. In response, the application 150 may generate a business scenario instance 154 using the business scenario template 152 and the provided values 156. The application 150 may then provide the business scenario instance 154 to the CEP runtime engine 206. The CEP runtime engine 206 may monitor the business scenario specified by the business scenario instance 154.

FIG. 3A illustrates the business scenario template 152 of FIG. 1, according to one embodiment of the invention. As shown, the business scenario template defines the following business scenario: for an asset $302_1$, the rate of rise or fall of data points—computed as an average of readings over a tracking duration $302_2$—over a period of monitoring duration $302_3$ is higher than a threshold $302_4$. The business scenario also specifies an action to be performed upon detecting the business scenario: alert 304. Further, the business scenario template 152 includes parameters 302 for customizing (i.e., modifying one or more parameter values of) the business scenario defined by the business scenario template. The parameters include the asset $302_1$, the tracking duration $302_2$, the monitoring duration $302_3$ and the threshold $302_4$. As described above, the business user may provide values 156 for these parameters to the application 150. In response, the application 150 may generate the business scenario instance 154 based on the business scenario template 152 and the provided values 156.

FIG. 3B illustrates the parameter values 156 of FIG. 1, according to one embodiment of the invention. As shown, each parameter value 156 is provided for a corresponding parameter 302. The parameter values 156 include a first value $156_1$ of "temperature transmitter 0001" (e.g., of a manufacturing plant) for the asset $302_1$, a second value $156_2$ of "10,000 milliseconds" for the tracking duration $302_2$, a third value $156_3$ of "30,000 milliseconds" for the monitoring duration $302_3$, and a fourth value $156_4$ of "65" (e.g., degrees in Fahrenheit) for the threshold $302_4$. As described above, using these provided values 156 and the business scenario template 152, the application 150 generates the business scenario instance 154.

FIG. 3C illustrates the business scenario instance 154 of FIG. 1, according to one embodiment of the invention. As shown, the business scenario instance 154 defines the following business scenario: for the temperature transmitter 0001 $156_1$, the rate of rise or fall of data points—computed as an average of readings over 10,000 milliseconds $156_2$—over a period of 30,000 milliseconds $156_3$ is higher than the threshold of 65 $156_4$. Once the business scenario instance 154 is generated, the business user may activate the business scenario instance 154. Once activated, the CEP runtime engine 206 may begin monitoring the business scenario defined by the business scenario instance 154. Upon detecting an occurrence of the business scenario, the CEP runtime engine 206 may execute the action defined by the business scenario instance 154 (e.g., generate an alert).

Figure 4:
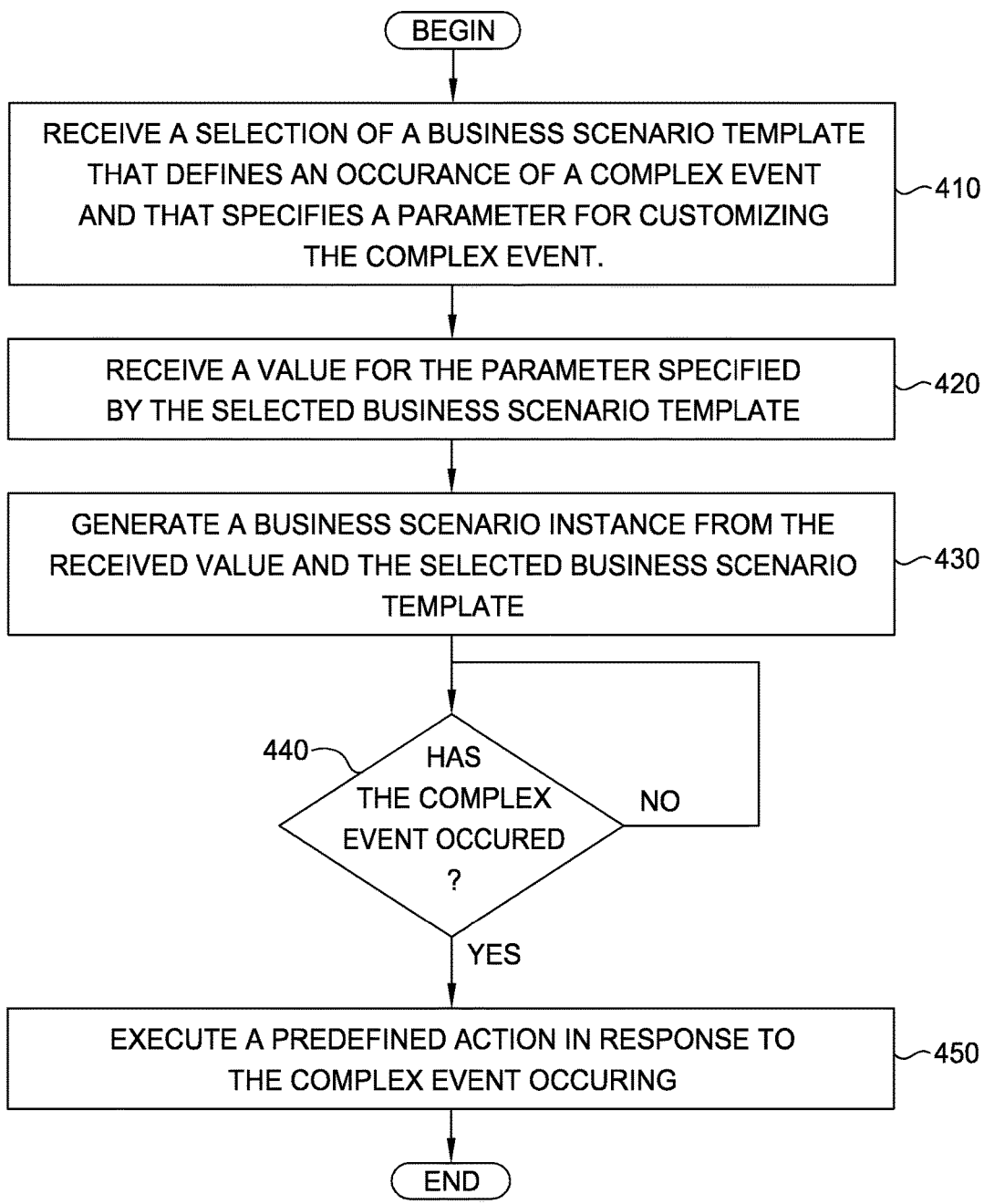
FIG. 4 is a flow diagram depicting a method for generating a business scenario instance, according to one embodiment of the invention.

FIG. 4 is a flow diagram depicting a method 400 for generating a business scenario instance 154, according to one embodiment of the invention. As shown, the method 400 begins at step 410, where the application 150 receives a selection of a business scenario template that defines an occurrence of a complex event and that specifies one or more parameters for customizing the complex event. For example, the business user 204 of FIG. 2 may select, from a list of available business scenario templates, the business scenario template 3A of FIG. 3. At step 420, the application 150 receives a value for the parameter specified by the selected business scenario template. For example the business user 204 may provide the parameter values 156 of FIG. 3B.

At step 430, the application 150 generates a business scenario instance from the received value and the selected business scenario template. For example, the application 150 may generate the business scenario instance 154 of FIG. 3C. In doing so, the application 150 may also process any additional business scenario templates referenced in the business scenario template 152. Assume that the business scenario instance has been activated (i.e., approved for monitoring). The business scenario instance may be represented as an XML definition. The XML definition may also store the received parameter values. At step 440, the CEP runtime engine determines whether the complex event has occurred. If not, the CEP runtime engine continues to monitor the complex event (step 440). Otherwise, at step 450 the CEP runtime engine executes a predefined action in response to the complex event occurring. For example, the CEP runtime engine may alert the business user that the complex event has occurred. The alert may be in the form of an email alert, a dialogue box on a graphical user interface (GUI), etc. The alert may include a name of the complex event, a timestamp of the occurrence of the complex event, any (other) predefined action taken in response to the occurrence of the complex event and the results thereof, etc.

In one embodiment, the action may be defined in the business scenario instance 154. The application 150 may also maintain a mapping for each business scenario instance and event sources for the respective business scenario instance. Depending on whether the business scenario instance is activated, the application 150 may dynamically (i.e., on demand, in response to the activating/deactivating of business scenario instances) subscribe/unsubscribe to the event sources for the business scenario instance. After the step 450, the method 400 terminates.

Figure 5:
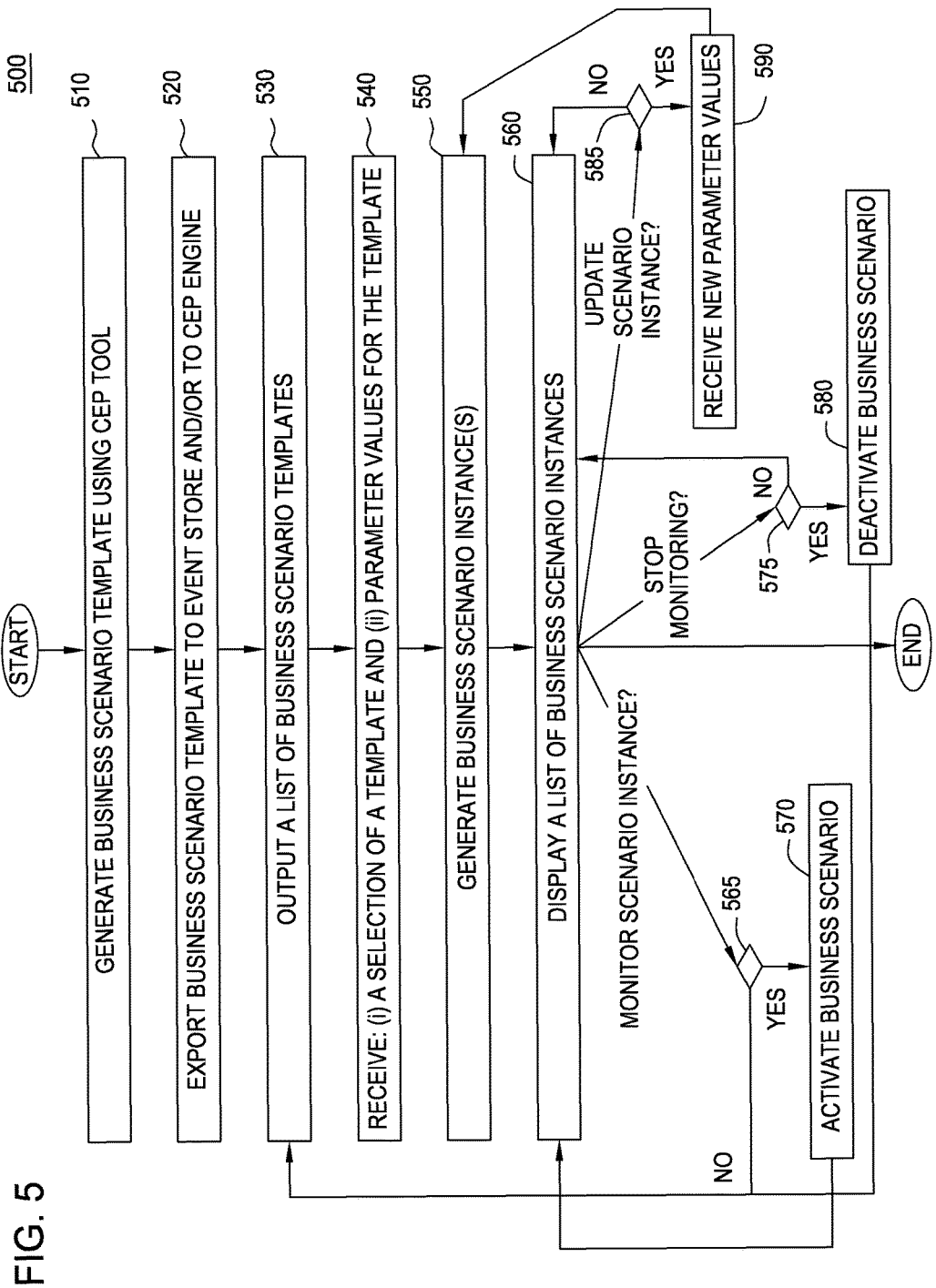
FIG. 5 is a flow diagram depicting a method for generating a business scenario template, according to one embodiment of the invention.

FIG. 5 is a flow diagram depicting a method 500 for generating and maintaining a business scenario instance 154, according to one embodiment of the invention. As shown, the method 500 begins at step 510, where the CEP tool expert generates a business scenario template using the CEP tool. The business scenario template may define events and rules, as well as a context for executing the rules. That is, the business scenario template may include rules (conditional logic) that specify a combination of events that constitutes an occurrence of the business scenario. The business scenario template may also specify event sources—i.e., where to monitor each event (e.g., a network location, protocol, and port number of the event source). The business scenario template may also define actions to invoke in response to detecting occurrence of a complex event. Further, the business scenario template may also include references to other business scenario templates.

At step 520, the CEP tool exports the business scenario template (e.g., to an event store and/or to a CEP runtime engine, etc.). The business scenario template may be exported using a CEP tool plugin and through an event definition service. The event definition service may be a RESTful service—i.e., the event definition service may conform to representational state transfer (REST) constraints. As is known, REST is a style of software architecture for distributed hypermedia systems such as the World Wide Web. The event definition service parses the business scenario template and extracts the parameters and event sources. The event definition service then stores the extracted parameters and event sources in an event store. In one embodiment, the event store is a relational database. The event definition service may also expose the event sources and the complex events (along with any associated attributes/parameters) to consuming applications. In one embodiment, the event definition service is a Java™ application, the event store is an IBM® DB2® database, and the CEP engine (and/or the CEP tool) is an IBM® Active Middleware Technology™ (AMiT) runtime engine. However, those skilled in the art will recognize that other technologies may be used in accordance with the techniques described herein.

At step 530, the application 150 outputs a list of available business scenario templates. The business user may select a business scenario template from the list. At step 540, the application 150 receives a selection of a business scenario template. The application 150 also receives parameter values for the selected business scenario template. At step 550, the application 150 generates a business scenario instance from the received parameter values and the selected business scenario template. The application 150 may generate an XML definition based on the received parameter values and store the XML definition in the event store. The XML definition represents the business scenario instance and may also include parameters (and associated values) of the business scenario template 154. At step 560, the application 150 outputs a list of generated business scenario instances. The business user may activate, deactivate, modify, and/or delete business scenario instances from the list. The event definition service may also make the business scenario instance available to consuming applications.

In one embodiment, if the business user requests to begin monitoring a business scenario instance (step 565), the application activates the business scenario instance (step 570). For example, the application 150 may activate the business scenario instance by adding the business scenario instance to the CEP runtime engine. If the business user requests to stop monitoring a business scenario instance (step 575), the application 150 deactivates the business scenario instance (step 580). For example, the application 150 may deactivate the business scenario instance by removing the business scenario instance from the CEP runtime engine.

If the business user requests to update a business scenario instance (step 585), the application 150 receives new parameter values for the business scenario instance (step 590). After the step 590, the application 150 modifies the business scenario instance or generates a new business scenario instance using the new parameter values (step 540). Advantageously, the business user may dynamically (i.e., on-demand) create multiple business scenario instances of a selected business scenario template by providing different parameter values. Because the business user is familiar with the business context of the business scenario and the parameters pertain to the business context, the business user can readily provide values for the parameters. When no requests from business user remain, the method 500 terminates.

Figure 6:
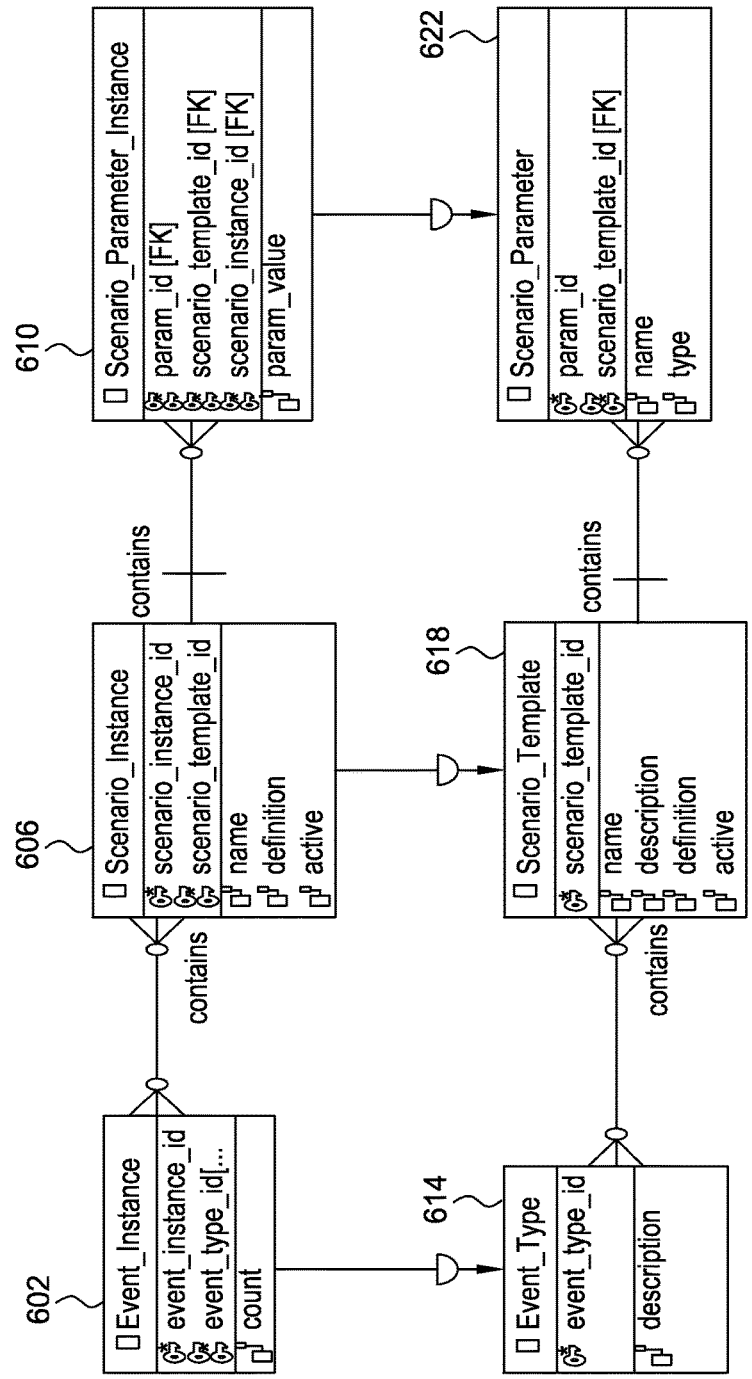
FIG. 6 illustrates a data model of an event store, according to one embodiment of the invention.

FIG. 6 illustrates a data model 600 of the event store, according to one embodiment of the invention. The event store may correspond to the storage 108 of FIG. 1. As shown, the data model 600 includes an event_instance entity 602, a scenario_instance entity 606, a scenario_parameter_instance entity 610, an event_type entity 614, a scenario_template entity 618, and a scenario_parameter entity 622. The event_instance entity 602 represents an event received from an event source (e.g., a stock quote). The event is an input to a business scenario instance, which is represented by the scenario_instance entity 606. The business scenario instance is also a type of event because the business scenario instance may also act as an input to another business scenario instance. The scenario_parameter_instance entity 610 represents a parameter value. The event_type entity 614 represents a type of event. The scenario_template entity 618 represents a business scenario template. The scenario_parameter entity 622 represents a parameter of the business scenario template.

Figure 7:
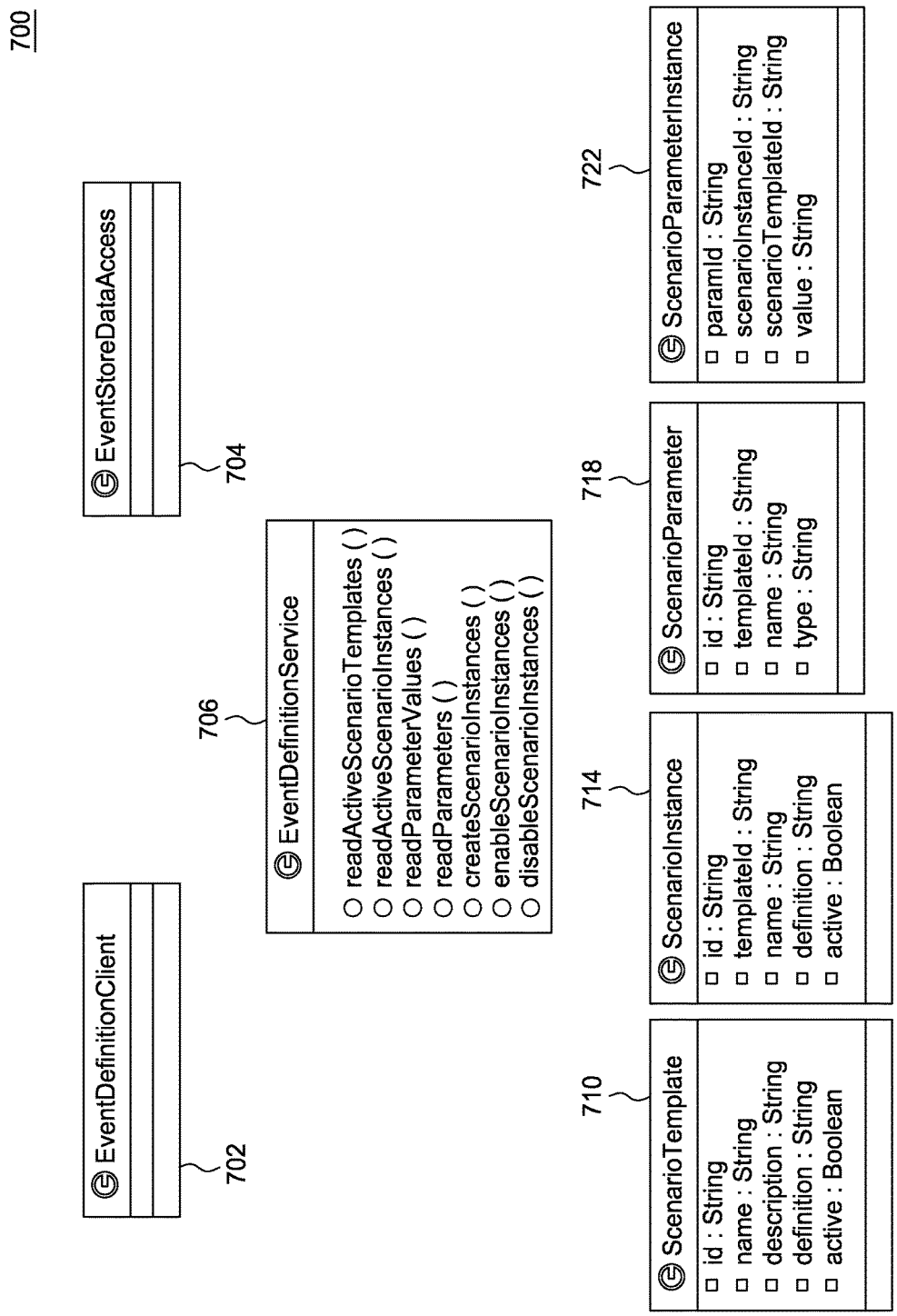
FIG. 7 illustrates a design model of an event definition service, according to one embodiment of the invention.

FIG. 7 illustrates a design model 700 of the event definition service, according to one embodiment of the invention. As shown, the design model 700 includes an EventDefinitionClient class 702, an EventStoreDataAccess class 704, an EventDefinitionService class 706, a ScenarioTemplate class 710, a ScenarioInstance class 714, a ScenarioParameter class 718, and a ScenarioParameterinstance class 722. The EventDefinitionService class 706 may include methods for reading business scenario templates and instances, respectively. The EventDefinitionService class 706 may also include methods for reading parameters and parameter values. Further, the EventDefinitionService class 706 may include methods for creating, enabling, and disabling a business scenario instance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for creating, reconfiguring, and reusing business scenarios. In one embodiment, a CEP tool expert may generate a business scenario template using a CEP tool. Once the business scenario template is generated, a business user may generate multiple business scenario instances from the business scenario templates by providing different parameter values for the business scenario template. Consequently, the business user may generate a business scenario instance without using the CEP tool and without involvement from the CEP tool expert. The business user may also activate, deactivate, modify, and delete business scenario instances without using the CEP tool and without involvement from the CEP tool expert.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing business scenarios defining derived events, based on a complex event processing (CEP) tool, a CEP configuration program, and a CEP runtime engine, the computer-implemented method comprising, by the CEP configuration program:

outputting an indication of a plurality of business scenario templates available for selection, wherein the plurality of business scenario templates is generated by the CEP tool;

receiving a selection of a business scenario template from the plurality of available business scenario templates, the business scenario template having at least one configurable parameter which, when configured, permits a corresponding business scenario to be generated from the business scenario template, the business scenario defining what constitutes an occurrence of an event derived from a plurality of lower-level events;

receiving input specifying an initial value for the at least one configurable parameter of the selected business scenario template;

generating the business scenario based on the initial value and the selected business scenario template and by the CEP configuration program when executed by one or more computer processors;

reconfiguring the business scenario by the CEP configuration program and based on a subsequent value specified for the at least one configurable parameter, the subsequent value being different from the initial value; and activating the reconfigured business scenario by the CEP configuration program, whereupon the activated business scenario is monitored by the CEP runtime engine, which is configured to, upon detecting the occurrence of the derived event defined by the business scenario, execute an action defined by the business scenario, wherein an indication of the executed action is output.

2. The computer-implemented method of claim 1, wherein the business scenario is generated without using any CEP tool.

3. The computer-implemented method of claim 1, further comprising:
responsive to a request to stop monitoring the business scenario, deactivating the business scenario.

4. The computer-implemented method of claim 1, wherein the business scenario specifies an event source, wherein the computer-implemented method further comprises:
subscribing to the event source in response to the business scenario being activated.

5. The computer-implemented method of claim 1, wherein the business scenario specifies an event source, wherein the computer-implemented method further comprises:
unsubscribing from the event source in response to the business scenario being deactivated.

6. The computer-implemented method of claim 1, wherein the business scenario is reconfigured prior to activation, wherein the business scenario specifies an event source, wherein the business scenario template is exported by the CEP tool via an event definition service and to an event store, wherein the event definition service confirms to a set of representational state transfer (REST) constraints, wherein the event definition service parses the business scenario template and extracts the at least one configurable parameter and the event source, wherein the event definition service exposes the event store and the derived event to the application.

7. The computer-implemented method of claim 6, wherein the computer-implemented method further comprises subscribing to the event source in response to the business scenario being activated, wherein the business scenario template serves to abstract a set of distinct business scenarios, wherein each of the distinct business scenarios corresponds to a distinct set of parameter values that the at least one configurable parameter of the business scenario template is configured to accept, wherein each of the distinct business scenarios is instantiated by generating the respective business scenario by configuring the business scenario template to include the corresponding set of parameter values;
wherein at least one of the derived event and the plurality of lower-level events includes a first event comprising a rate of rise or fall of data points of a specified asset exceeding a specified threshold rate, the rate computed as an average, over a specified averaging duration, of readings monitored over a specified monitoring duration.

8. The computer-implemented method of claim 7, wherein the business scenario template is generated based at least in part on user input from a first user via a first application configured to generate both business scenario templates and business scenarios based on user input, the first application comprising the CEP tool;
wherein the business scenario is generated based at least in part on user input from a second user via a second application different than the first application, without requiring the second user to use the first application to generate the business scenario template and without requiring the second user to use the first application to generate the business scenario, wherein the first application requires a higher degree of technical expertise than the second application, wherein the second user is different from the first user, wherein the second application comprises the CEP configuration program;
wherein the business scenario is monitored via a third application different from the first and second applications, the third application comprising the CEP runtime engine.

9. The computer-implemented method of claim 8, wherein each lower-level event is detected subsequent to subscribing to a respective event source for the respective lower-level event;
wherein the derived event, the plurality of lower-level events, the business scenario, and the business scenario template are represented according to a predefined data model, the predefined data model comprising a plurality of entities including an event-instance entity, a scenario-instance entity, a scenario-parameter-instance entity, an event-type entity, a scenario-template entity, and a scenario-parameter entity.

10. The computer-implemented method of claim 9, wherein the event-instance entity includes an event-instance identifier, an event-type identifier, and a count; wherein the scenario-instance entity includes a scenario-instance identifier, a scenario-template identifier, a name, a definition, and an active flag; wherein the scenario-parameter-instance entity includes a parameter identifier, a scenario-template identifier, a scenario-instance identifier, and a parameter value;
wherein the event-type entity includes an event-type identifier and a description; wherein the scenario-template entity includes a scenario-template identifier, a name, a description, an definition, and an active flag; wherein the scenario-parameter entity includes a parameter identifier, a scenario-template identifier, a name, and a type.

11. The computer-implemented method of claim 10, further comprising, upon outputting a list of generated business scenarios for display:
responsive to a request to begin monitoring a business scenario in the list, activating the business scenario by adding the business scenario to the CEP runtime engine;
responsive to a request to stop monitoring a business scenario in the list, deactivating the business scenario by removing the business scenario from the CEP runtime engine; and
responsive to a request to update a business scenario in the list, receiving further input reconfiguring the business scenario and generating a new business scenario using the further input.

12. The computer-implemented method of claim 11, wherein the derived event, the plurality of lower-level events, the business scenario, and the business scenario template are implemented according to a predefined design model, the predefined design model comprising a plurality of classes including an event-definition-client class, an event-store-data-access class, an event-definition-service class, a scenario-template class, a scenario-instance class, a scenario-parameter class, and a scenario-parameter-instance class.

13. The computer-implemented method of claim 12, wherein the scenario-template class specifies an identifier, a name, a description, a definition, and an active flag; wherein the scenario-instance class specifies an identifier, a template identifier, a name, a definition, and an active flag; wherein the scenario-parameter class specifies an identifier, a template identifier, a name, and a type;

wherein the scenario-parameter-instance class specifies a parameter identifier, a scenario-instance identifier, a scenario-template identifier, and a parameter value; wherein the event-definition-service class includes operations for reading business scenario templates and business scenarios, reading parameters and parameter values, and creating, enabling, and disabling business scenarios.

14. The computer-implemented method of claim 13, wherein the specified asset comprises a temperature transmitter of a manufacturing plant, wherein the data points comprise temperature readings of the temperature transmitter;

wherein each of the specified asset, the specified averaging duration, the specified monitoring duration, and the specified threshold rate are configurable via the business scenario template, wherein the event store comprises a relational database.

15. A non-transitory computer-readable medium containing a complex event processing (CEP) configuration program which, when executed, performs an operation of managing business scenarios defining derived events, based on a CEP tool, the CEP configuration program, and a CEP runtime engine, the operation comprising:

outputting an indication of a plurality of business scenario templates available for selection, wherein the plurality of business scenario templates is generated by the CEP tool;

receiving a selection of a business scenario template from the plurality of available business scenario templates, the business scenario template having at least one configurable parameter which, when configured, permits a corresponding business scenario to be generated from the business scenario template, the business scenario defining what constitutes an occurrence of an event derived from a plurality of lower-level events;

receiving input specifying an initial value for the at least one configurable parameter of the selected business scenario template;

generating the business scenario based on the initial value and the selected business scenario template and by operation of one or more computer processors when executing the CEP configuration program;

reconfiguring the business scenario by the CEP configuration program and based on a subsequent value specified for the at least one configurable parameter, the subsequent value being different from the initial value; and activating the reconfigured business scenario by the CEP configuration program, whereupon the activated business scenario is monitored by the CEP runtime engine, which is configured to, upon detecting the occurrence of the derived event defined by the business scenario, execute an action responsive to the occurrence of the derived event, wherein an indication of the executed action is output.

16. The non-transitory computer-readable medium of claim 15, wherein the business scenario is generated without using any CEP tool.

17. The non-transitory computer-readable medium of claim 15, wherein the operation further comprises:

responsive to a request to stop monitoring the business scenario, deactivating the business scenario.

18. The non-transitory computer-readable medium of claim 15, wherein the business scenario specifies an event source, wherein the operation further comprises:

subscribing to the event source in response to the business scenario being activated.

19. The non-transitory computer-readable medium of claim 15, wherein the business scenario specifies an event source, wherein the operation further comprises:

unsubscribing from the event source in response to the business scenario being deactivated.

20. A system of managing business scenarios defining derived events, based on a complex event processing (CEP) tool, a CEP configuration program, and a CEP runtime engine, the system comprising:

one or more computer processors;

a memory containing the CEP configuration program which, when executed by the one or more computer processors, is configured to perform an operation comprising:

outputting an indication of a plurality of business scenario templates available for selection, wherein the plurality of business scenario templates is generated by the CEP tool;

receiving a selection of a business scenario template from the plurality of available business scenario templates, the business scenario template having at least one configurable parameter which, when configured, permits a corresponding business scenario to be generated from the business scenario template, the business scenario defining what constitutes an occurrence of an event derived from a plurality of lower-level events;

receiving input specifying an initial value for the at least one configurable parameter of the selected business scenario template;

generating the business scenario based on the initial value and the selected business scenario template;

reconfiguring the business scenario by the CEP configuration program and based on a subsequent value specified for the at least one configurable parameter, the subsequent value being different from the initial value; and activating the reconfigured business scenario by the CEP configuration program, whereupon the activated business scenario is monitored by the CEP runtime engine, which is configured to, upon detecting the occurrence of the derived event defined by the business scenario, execute an action responsive to the occurrence of the derived event, wherein an indication of the executed action is output.

21. The system of claim 20, wherein the business scenario is generated without using any CEP tool.

22. The system of claim 20, wherein the operation further comprises:

responsive to a request to stop monitoring the business scenario, deactivating the business scenario.

23. The system of claim 20, wherein the business scenario specifies an event source, wherein the operation further comprises:

subscribing to the event source in response to the business scenario being activated.

24. The system of claim 20, wherein the business scenario specifies an event source, wherein the operation further comprises:

unsubscribing from the event source in response to the business scenario being deactivated.

* * * * *